United States Patent [19]

Goff

[11] Patent Number: 5,070,292
[45] Date of Patent: Dec. 3, 1991

[54] PULSE-WIDTH MODULATED CIRCUIT FOR DRIVING A LOAD

[75] Inventor: Jerry K. Goff, Doylestown, Pa.

[73] Assignee: Performance Controls, Inc., Horsham, Pa.

[21] Appl. No.: 435,258

[22] Filed: Nov. 13, 1989

[51] Int. Cl.$^5$ ............................................. H02P 5/00
[52] U.S. Cl. .................................. 318/811; 318/599; 388/811; 388/907.2
[58] Field of Search ............................... 318/798-802, 318/806, 807-811, 812, 254, 599; 388/819, 811-815, 829, 831, 907.2, 915

[56] References Cited

U.S. PATENT DOCUMENTS

| | | |
|---|---|---|
| 3,260,912 | 7/1966 | Gregory . |
| 3,351,873 | 11/1967 | Kimura . |
| 3,393,363 | 7/1968 | Forster . |
| 3,535,657 | 10/1970 | Webb . |
| 3,849,709 | 11/1974 | Berman et al. ................ 318/798 |
| 3,883,786 | 5/1975 | McNaughton et al. ........ 388/811 |
| 4,388,579 | 6/1983 | Ellis ............................... 318/732 |
| 4,562,549 | 12/1985 | Tanaka et al. ............... 388/811 X |
| 4,581,693 | 4/1986 | Ueda et al. ................... 363/96 X |
| 4,584,505 | 4/1986 | Chung et al. ................ 318/138 X |
| 4,615,000 | 9/1986 | Fujii et al. ................... 318/811 X |
| 4,617,675 | 10/1986 | Ashikaga ....................... 375/22 |
| 4,626,803 | 12/1986 | Holm ............................. 332/9 R |
| 4,686,436 | 8/1987 | Archer .......................... 318/254 |
| 4,689,802 | 8/1987 | McCambridge ............... 375/22 |
| 4,698,744 | 10/1987 | Itani et al. ................... 318/811 X |
| 4,706,180 | 11/1987 | Wills ........................... 318/811 X |
| 4,742,316 | 5/1988 | Riedger ........................ 332/9 R |
| 4,763,059 | 8/1988 | Espelage et al. ............. 318/811 |
| 4,904,919 | 2/1990 | McNaughton .............. 318/811 X |

OTHER PUBLICATIONS

Reprint: Motion, Jul./Aug. 1987, "Basic PWM Servo-Amplifier Theory".

Primary Examiner—William M. Shoop, Jr.
Assistant Examiner—David Martin
Attorney, Agent, or Firm—William H. Eilberg

[57] ABSTRACT

A pulse-width modulated circuit applies a voltage across a load in accordance with a command signal. The command signal is converted into first and second trains of pulses, by electronically comparing the command signal, and its inverse, with a triangular dither signal. These two pulse trains, and two pulse trains obtained by taking the complements of the original pulse trains, are applied to a pair of bridge circuits. The load is connected to both bridge circuits. Both bridge circuits include electronic switching devices actuated by the pulses. The bridge circuits are configured such that when a pulse is present, from either the first or the second pulse train, no net voltage appears across the load. At all other times, substantially the entire power supply voltage is applied across the load. Compared to pulse-width modulated circuits of the prior art, having similar pulse frequencies and power supplies, the present circuit reduces the undesirable effects of current ripple through the load by a factor of four. This reduction is due to the use of two alternating pulse trains, which doubles the effective frequency of pulses, and to the fact that the maximum voltage excursion of the signal across the load is no greater than the absolute value of the maximum power supply voltage available. As a result, the present circuit has a much higher bandwidth than circuits of the prior art having comparable voltage and frequency parameters.

20 Claims, 4 Drawing Sheets

PULSE-WIDTH MODULATED CIRCUIT FOR DRIVING A LOAD

BACKGROUND OF THE INVENTION

This invention relates to the field of pulse-width modulation systems for causing currents to flow through a load in response to a command signal. The invention is particularly useful in the field of motion control, such as in servo-amplifiers, brushless motors, and the like.

It has been known to control a motor with a servomechanism, wherein the current through the motor is held at a desired value, the desired value being represented by a command signal. The servomechanism regulates the current in the motor by comparing the command signal voltage with a feedback voltage, the latter being an appropriately scaled signal representative of the motor current. The difference between the command signal and the feedback signal is called the "error signal", and is used to drive an amplifier which applies current to the load.

Linear power amplifiers have been used for increasing the level of the error signal, so as to provide a signal capable of driving the motor. However, linear amplifiers dissipate power, and this power dissipation substantially reduces the efficiency of the system. A system which dissipates power must be provided with heat sinks, cooling fans, and similar apparatus, and the system,s size and weight is therefore increased. The energy used to develop the power dissipated in the amplifier is wasted, increasing the overall cost of operation. Furthermore, excessive heat is known to shorten the useful lives of the semiconductor devices used in the amplifier.

Because of the above-described disadvantages of the linear amplifiers used to drive motors, it has been recognized that it is preferable to provide a power stage which does not dissipate power. A pulse-width modulated (PWM) circuit achieves this goal. In a pulse-width modulated circuit, the command signal is used to generate a train of pulses, the width of each pulse being related to the instantaneous value of the command signal. The pulses are generated by using a comparator to compare the command signal with a dither signal, which is a sawtooth or triangular wave. When the command signal exceeds the dither signal, the output of the comparator is high; at other times, the output of the comparator is low. The comparator output thus comprises the train of pulses representing the command signal.

The pulses are then used to drive an electronic switching device, such as one or more transistors, for intermittently applying a voltage across the load. When transistors are used as switches, they are either fully on (i.e. saturated) or fully off ("cut-off"). Thus, virtually no power is dissipated in the transistors, because when the transistors are saturated, there is almost no voltage drop, and when they are cut-off, there is negligible current flow. Thus, in effect, a PWM circuit comprises a switch for applying the voltage of the power supply across the load, wherein the switch does not itself consume appreciable power.

In practice, transistor switches do consume small amounts of power, because they are never totally cut-off or resistance-free. But the efficiency of a PWM circuit can be as high as about 90-95%, compared with only about 40% for linear amplifiers.

One problem associated with PWM circuits is current ripple. When a voltage is suddenly applied across an inductive and resistive load, such as an electric motor, the current through the motor rises almost linearly with time. When the voltage is then turned off, i.e. at the trailing edge of a voltage pulse, the current through the motor does not immediately fall to zero, but decreases approximately linearly with time, as the inductor's magnetic field collapses. Thus, the input voltage pulses applied across the load result in a current which has a ripple. This ripple is inherent to all PWM amplifiers. To some extent, the inductance of the motor acts as a filter for smoothing the ripple. The magnitude of the ripple is directly proportional to the supply voltage and inversely proportional to the switching frequency and the inductance of the motor. However, in most applications, the inductance of the motor and the power supply voltage are fixed. The easiest way of reducing the ripple is therefore to increase the switching frequency. However, doing so increases switching losses in the transistor switches.

The amount of ripple is further increased by the fact that, in PWM circuits of the prior art, the maximum voltage excursion is twice the magnitude of the supply voltage. Thus, if the supply voltage is designated as V, the switching network which produces the pulses alternately applies voltages of $+V$ and $-V$ across the load. Thus, the maximum excursion is 2V. The greater the voltage excursion, the greater the current ripple.

Current ripple is undesirable because it wastes energy in the motor. The ripple current waveform has both an average value and an rms value. The motor can respond only to the average current. If the current has any ripple, the rms value is larger than the average value. The difference between the rms current and the average current contributes only to wasteful heating of the motor, thus reducing efficiency. In order to achieve maximum efficiency, the average and rms currents must be equal. This condition occurs only when there is no ripple, i.e. when there is a constant DC waveform.

The present invention provides a circuit which, for a given basic frequency of the dither signal, and a given magnitude of the supply voltage, produces a PWM signal which reduces current ripple by a factor of four, as compared with comparable PWM circuits of the prior art. The invention comprises a unique double bridge circuit which forms alternate electrical paths for applying a voltage of the desired polarity across the load, at any given instant.

SUMMARY OF THE INVENTION

In the preferred embodiment, the apparatus of the present invention includes two bridge circuits, connected together, both bridge circuits being connected to the load. Both bridge circuits comprise a set of switches, preferably electronic switches such as transistors. The inputs to the switches comprise electronic pulses which turn the switches on and off, and which thereby open and close various electrical paths for applying a voltage to the load.

The pulses applied to the electronic switches are generated from the command signal. The absolute value of the command signal is compared with a dither signal, which is preferably a triangular wave, and a pulse is generated whenever the command signal exceeds the dither signal. Also, the inverse of the command signal is similarly compared with the dither signal, and the inverted output of this comparison produces another train of pulses. The complements of both of these pulse trains are also obtained, and are applied to some of the various electronic switches in the bridges.

The bridges comprise logic circuitry for applying voltage across the load in response to various conditions of the input pulses. The bridges are connected such that, at certain moments, their respective contributions to the voltage applied across the load cancel each other, and, at other moments, the contributions have the same polarity. The net result is that the voltage applied across the load is zero during those moments when a pulse is present in either of the original two pulse trains, and is equal to the supply voltage at all other times.

Because both the command signal and its inverse are compared with the dither signal, the effective frequency of the voltage pulses applied to the load is twice that of comparable PWM circuits of the prior art. Also, because both bridges connect the load to the same power supply, the maximum voltage excursion can never be more than the magnitude of the supply voltage. This maximum excursion is one-half the excursion of comparable PWM circuits of the prior art. Since the amount of current ripple in the load is proportional to the frequency and to the voltage excursion, the circuit of the present invention effectively reduces the amount of ripple by a factor of four, when compared to a PWM circuit having a similarly rated power supply and a dither signal of similar frequency.

It is therefore an object of the present invention to provide an improved pulse-width modulated (PWM) circuit for driving a load.

It is another object to provide a PWM circuit in which the current ripple through the load is effectively reduced by a factor of four, as compared with PWM circuits of the prior art having comparable voltage and frequency parameters.

It is another object of the invention to increase the bandwidth of PWM circuits.

It is another object to increase the efficiency of PWM circuits, especially in the control of servo-motors, and in other applications.

It is another object to provide a method of controlling the current across a load.

It is another object to provide a circuit which can be used for efficient control of a brushless motor having a plurality of windings.

It is another object to provide a circuit which can be used for controlling switching power supplies, and for other purposes.

Other objects and advantages will be apparent to those skilled in the art, from a reading of the following brief description of the drawings, the detailed description of the invention, and the appended claims.

DETAILED DESCRIPTION OF THE INVENTION

Figure 1:
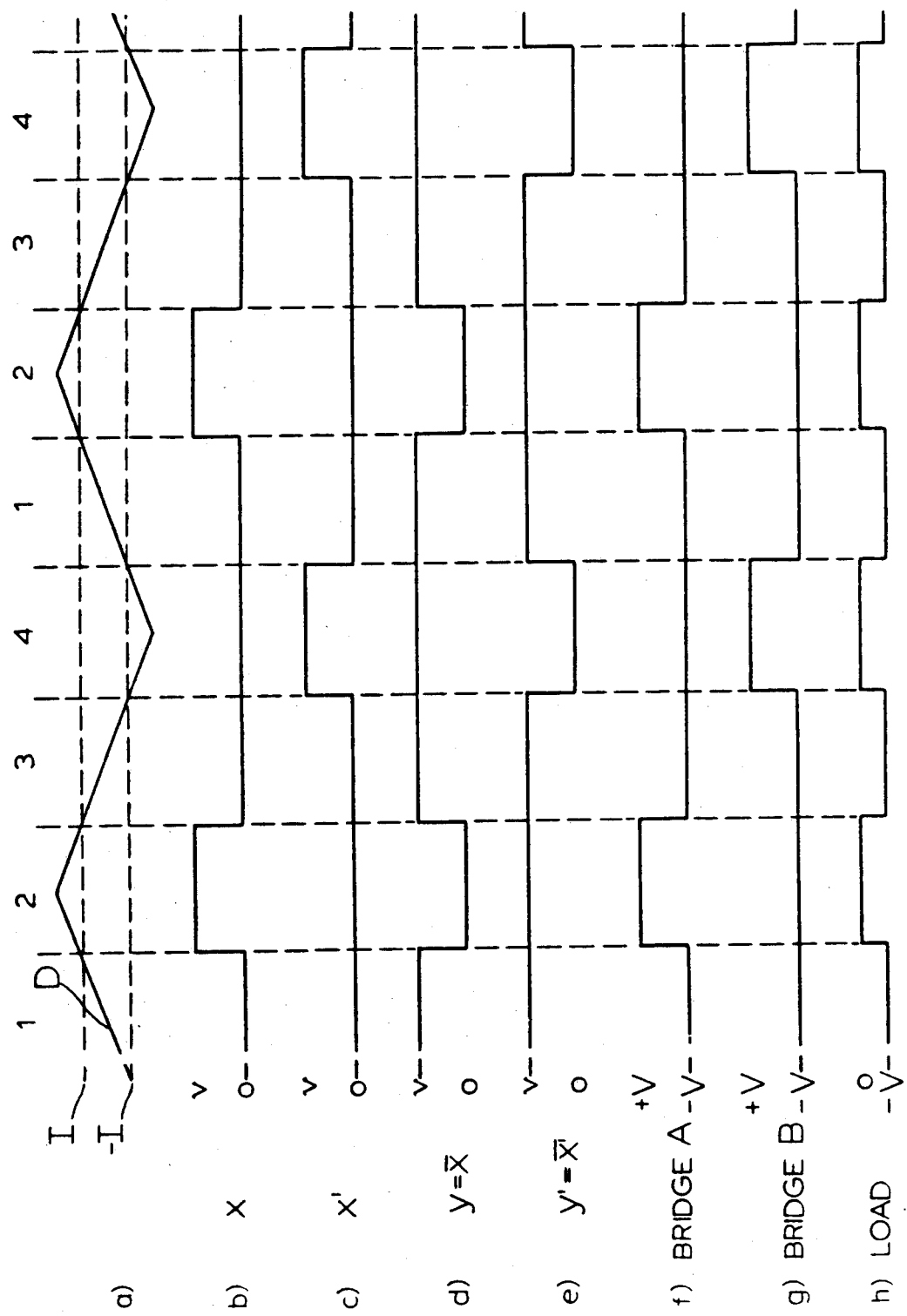
FIG. 1 shows a set of waveforms which illustrate the operation of the present invention.

FIG. 1 shows a set of waveforms which illustrate the operation of the circuit of the present invention. The circuit itself is shown, in schematic form, in FIGS. 2 and 3.

Figure 2:
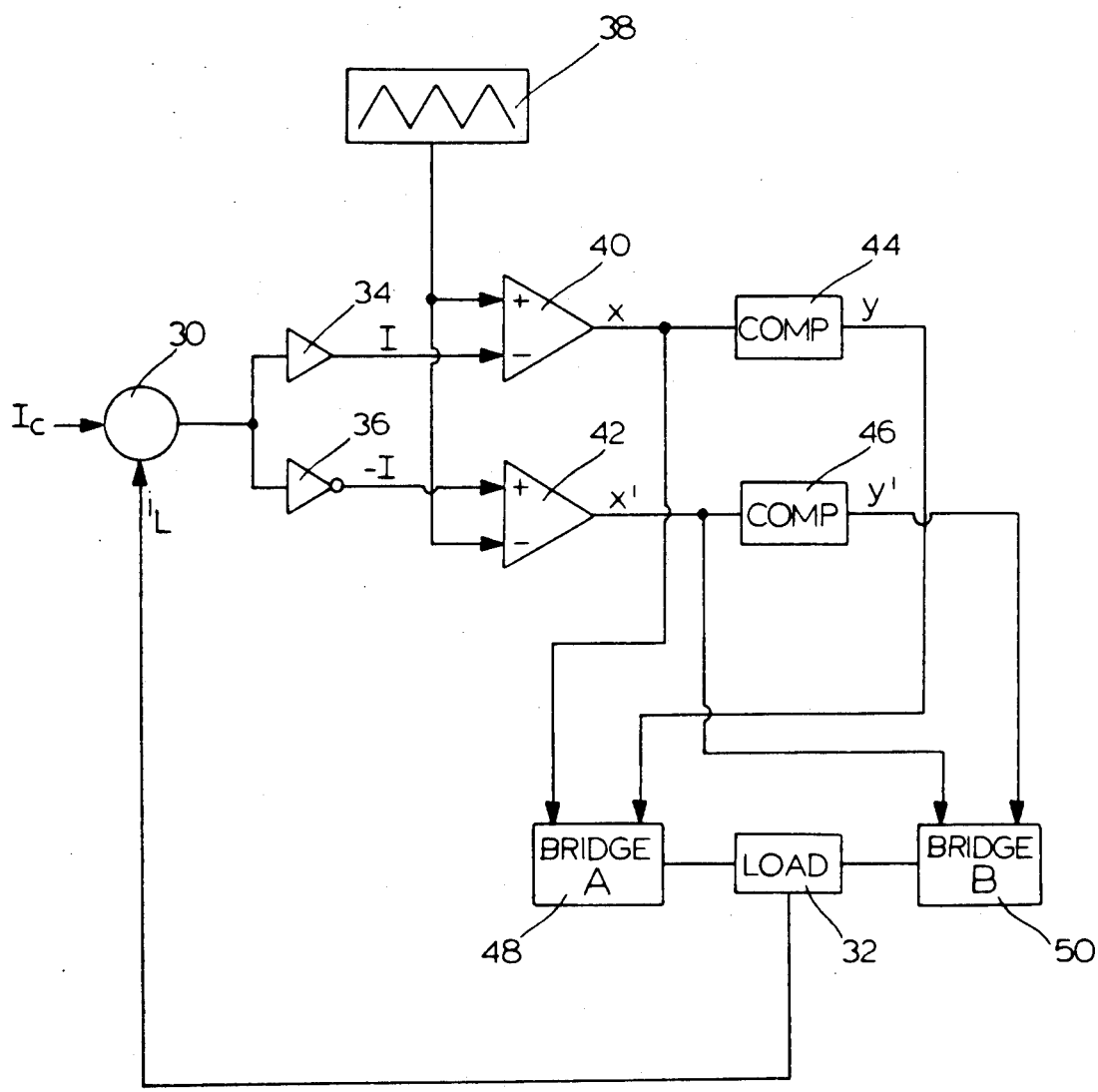
FIG. 2 is a block diagram of the pulse-width modulated circuit of the present invention, the figure showing the bridge circuits of the invention in block form.

FIG. 2 shows the general arrangement of a servo-amplifier feedback loop, as modified to incorporate the present invention. Command current signal $I_c$ is combined with current signal $i_L$ from load 32, in summing circuit 30. The combined current signal is passed through amplifiers 34 and 36, amplifier 36 being an inverting amplifier, as shown. The signals from amplifiers 34 and 36 are fed to comparators 40 and 42, respectively, where they are compared with a dither signal, having a sawtooth or triangular shape, produced by sawtooth wave generator 38.

The comparison of the signals described above is illustrated in FIGS. 1a, 1b, and 1c. Current signal I is compared with dither signal D, such that when D exceeds I, the output of comparator 40 becomes high, and at all other times, the output of comparator 40 is low. The result is signal x, shown in FIG. 1b. Signal x is thus a train of pulses having an amplitude defined by voltage v. Voltage v represents the maximum output voltage of the comparator.

At the same time, the negative of the current signal $(-I)$, taken from amplifier 36, is compared with the dither signal, in comparator 42. As shown in FIG. 2, the dither signal is connected to the inverting input of comparator 42. The connection is such that when the dither signal is less than the negative current signal $(-I)$, the output of the comparator becomes high. The output of comparator 42 is the pulse train shown in FIG. 1c. This pulse train is called signal x'. The FIGS. 1b and 1c are drawn to the same voltage scale. It should be noted that signals x and x' are independent signals, and are not necessarily mirror images of each other. The latter statement is true because the command current signal, in general, varies with time.

The signals x and x' are passed through complementing circuits 44 and 46, to generate signals y and y', respectively. The latter signals are illustrated in FIGS. 1d and 1e, respectively. These signals are strictly dependent on signals x and x', because they are obtained only by complementation.

Signals x and y are fed into bridge A, indicated by reference numeral 48. Signals x' and y' are fed into bridge B, indicated by reference numeral 50. The structures of both bridges will be explained in detail below. Load 32 is connected to the two bridges; the connection indicated in FIG. 2 is symbolic only. The precise manner of connection will be described later.

Figure 3:
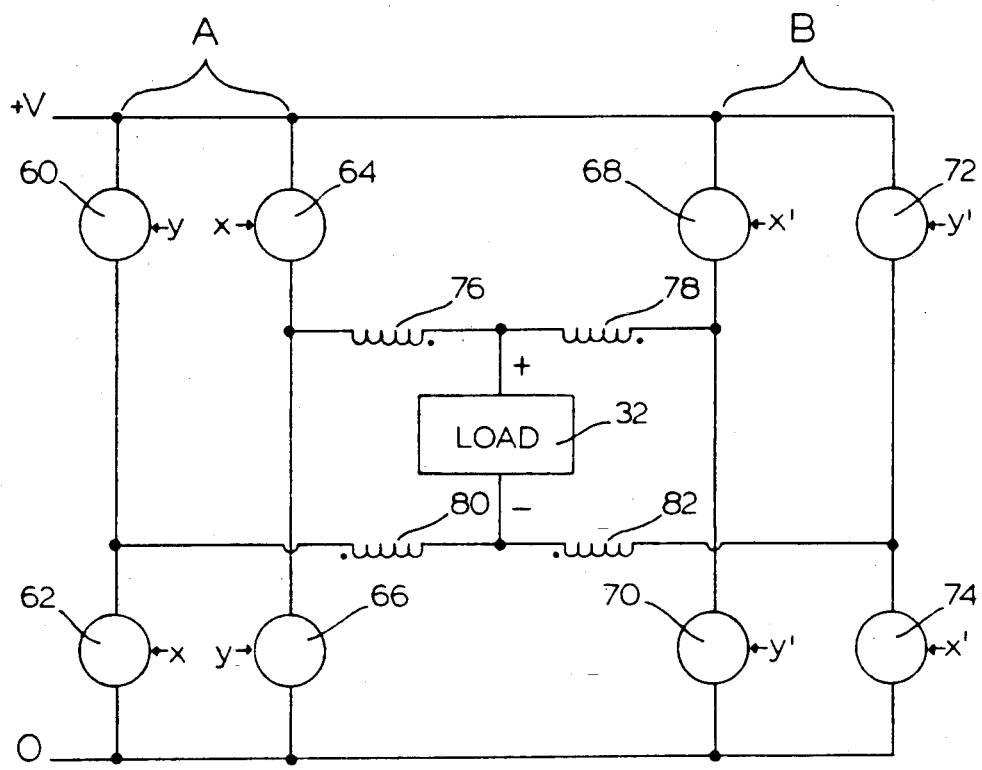
FIG. 3 is a schematic diagram of the bridge circuits of the present invention, indicated in block form in FIG. 2.

FIG. 3 shows the bridge circuits represented in block form in FIG. 2. The bridge circuits are connected across one power supply, having a voltage of V. Note that, in general, V and v need not be equal; normally, V, the voltage ultimately applied across the load, is much greater than v, the amplitude of the control pulses. Bridge A includes switches 60, 62, 64, and 66. These switches are preferably electronic switches, such as transistors. Bridge B includes switches 68, 70, 72, and 74, preferably similar to the switches of bridge A. Load 32 is connected to the two bridge circuits, through inductors 76, 78, 80, and 82. The load may be a motor, or any other inductive or resistive load.

As indicated schematically in FIG. 3, each of the switches of bridge A is controlled by one of the signals x or y. Each of the switches of bridge B is controlled by one of the signals x' or y'. When a pulse signal input to a switch is high, the switch is closed. When the input is low, the switch is open.

The operation of the circuit of the present invention can be analyzed by considering the four cases, illustrated in FIG. 1a by numbers 1, 2, 3, and 4. In Case 1, x is low and x' is low. In Case 2, x is high and x' is low. In Case 3, x is low and x' is low. And in Case 4, x is low and x' is high. Note that although Cases 1 and 3 have the same pattern, they are physically independent cases. The time duration, or "width", of Case 3 is not necessarily equal to that of Case 1, because the command signal changes with time.

First, consider Case 1, where the absolute value of the command signal exceeds that of the dither signal. Signals x and x' are low, and signals y and y' are high. Therefore, in FIG. 3, switches 60, 66, 70, and 72 are closed, and the other switches are open. Current can flow to the load through bridge A, by passing from the power supply (+V), through switch 60, through inductor 80, through load 32, through inductor 76, through switch 66, and back to the power supply. We adopt the convention that if the power supply voltage +V is connected to the terminal of the load marked "+", the voltage applied to the load is positive. If the power supply voltage is applied to the terminal marked "−", the voltage "seen" by the load is negative. Thus, in Case 1, the load "sees" a voltage equal to the negative of the supply voltage (−V). The voltage applied to the load by bridge A is illustrated in the graph of FIG. 1f.

At the same time, current can flow to the load from bridge B, from the power supply, through switch 72, inductor 82, load 32, inductor 78, and switch 70. The polarity of the voltage is the same as for bridge A. The voltage applied to the load by bridge B is shown in the graph of FIG. 1g.

Although both bridge A and bridge B apply a voltage of −V across the load, there are only V volts available, so the load can "see" no more than V volts. Thus, when the contributions of bridge A and bridge B are combined, the result is as shown in FIG. 1h. FIG. 1h represents the actual voltage seen by the load. FIG. 1h thus shows the net effect of bridges A and B.

Next, consider Case 2. In this case, the dither signal is positive, and is greater than the command signal. Signal x is high and signal x' is low. Thus, signal y is low and signal y' is high. Therefore, only switches 62, 64, 70, and 72 are closed. For bridge A, current flows from the power supply (+V), through switch 64, inductor 76, load 32, inductor 80, and switch 62. Bridge A therefore places a positive voltage of +V across the load, as illustrated in FIG. 1f. For bridge B, current flows from the power supply, and through switch 72, inductor 82, load 32, inductor 78, and switch 70. Thus, bridge B places a negative voltage (−V) across the load, because it connects the power supply to the load in the opposite direction from bridge A. The effect of bridge B is shown in FIG. 1g. The net effect of the two bridges is shown in FIG. 1h. Thus, the load "sees" zero volts in Case 2.

Now consider Case 3. Here, the absolute value of the dither signal is again less than that of the command signal. Therefore, the results are the same as in Case 1. FIG. 1h shows that the load "sees" −V volts in Case 3.

In Case 4, the dither signal is negative, and has an absolute value greater than that of the command signal. Signal x is low and signal x' is high. Thus, signal y is high and signal y' is low. The only closed switches are now switches 60, 66, 68, and 74. The circuit path through bridge A includes switch 60, inductor 80, load 32, inductor 76, and switch 66. The load therefore "sees" a voltage of −V due to bridge A, as shown in FIG. 1f. The circuit path through bridge B includes switch 68, inductor 78, load 32, inductor 82, and switch 74. The load therefore sees a voltage of +V due to bridge B, as shown in FIG. 1g. The net effect of the two bridges is that the load "sees" zero volts, as shown in FIG. 1h.

The inductors, or their equivalents, are necessary to prevent short circuits in Cases 2 and 4. In Case 2, for example, without the inductors, there would be a direct path from the power supply (+V), through switch 64, switch 70, and back to the power supply. There would also be a short circuit through switches 72 and 62. Similarly, in Case 4, without the inductors there would be a short circuit from the power supply (+V) through switch 60, through switch 74, and back to the power supply. There would also be a short circuit through switches 68 and 66. As long as the frequency of pulses is sufficiently high that the period of the pulses is less than the time constant of the inductors, the inductors will prevent short circuits.

Inspection of FIG. 1h, the graph of the net voltage applied to the load, reveals the advantages of the invention. First, the frequency of pulses in FIG. 1h is twice the frequency of pulses in signal x. Signal x is equivalent to a PWM signal of the prior art. By using both the positive-going and negative-going portions of the dither signal to generate pulses, the circuit of the present invention doubles the frequency of the resultant PWM signal applied to the load. Secondly, the maximum voltage excursion of the signal in FIG. 1h is V, i.e. the magnitude of the supply voltage, not 2V as is true in the prior art. As explained earlier, current ripple in the load is reduced by increasing the frequency of the PWM signal, and by reducing the voltage excursion of this signal. Thus, as compared to conventional PWM circuits having a dither signal of comparable frequency and having a power supply of the same voltage, the present invention achieves a reduction in ripple by a factor of four. The effective bandwidth of the PWM circuit of the present invention is therefore much greater than in PWM circuits of the prior art.

The present invention avoids the undesirable switching losses that would be incurred by simply increasing the frequency of the dither signal. The switches are controlled separately by the signals x, x', y, and y'. All of these signals, taken separately, have a frequency which is one-half that of the waveform of FIG. 1h. Thus, the switches are not driven at excessive switching rates. But it is the high-frequency waveform of FIG. 1h which is "seen" by the load.

In the preferred embodiment, inductors 76 and 78 are magnetically coupled, but wound in an opposed sense. The same is true for the pair of inductors 80 and 82, although the inductors of one pair are not magnetically coupled to the inductors of the other pair. The magnetic coupling of the pairs of inductors may be most easily accomplished by winding both inductors of a pair on the same core. The electrical connections are otherwise the same as shown in FIG. 3. This arrangement gives the system a greater usable bandwidth because, when the bridges are delivering power, the inductive effects tend to cancel. For a given amplifier gain and supply voltage, the bandwidth is limited only by the load itself.

The magnetic coupling of the pairs of inductors is symbolically represented by the heavy dots placed near the inductors, in FIG. 3.

The invention can be practiced without winding the inductors as stated above, but with reduced bandwidth.

Figure 4:
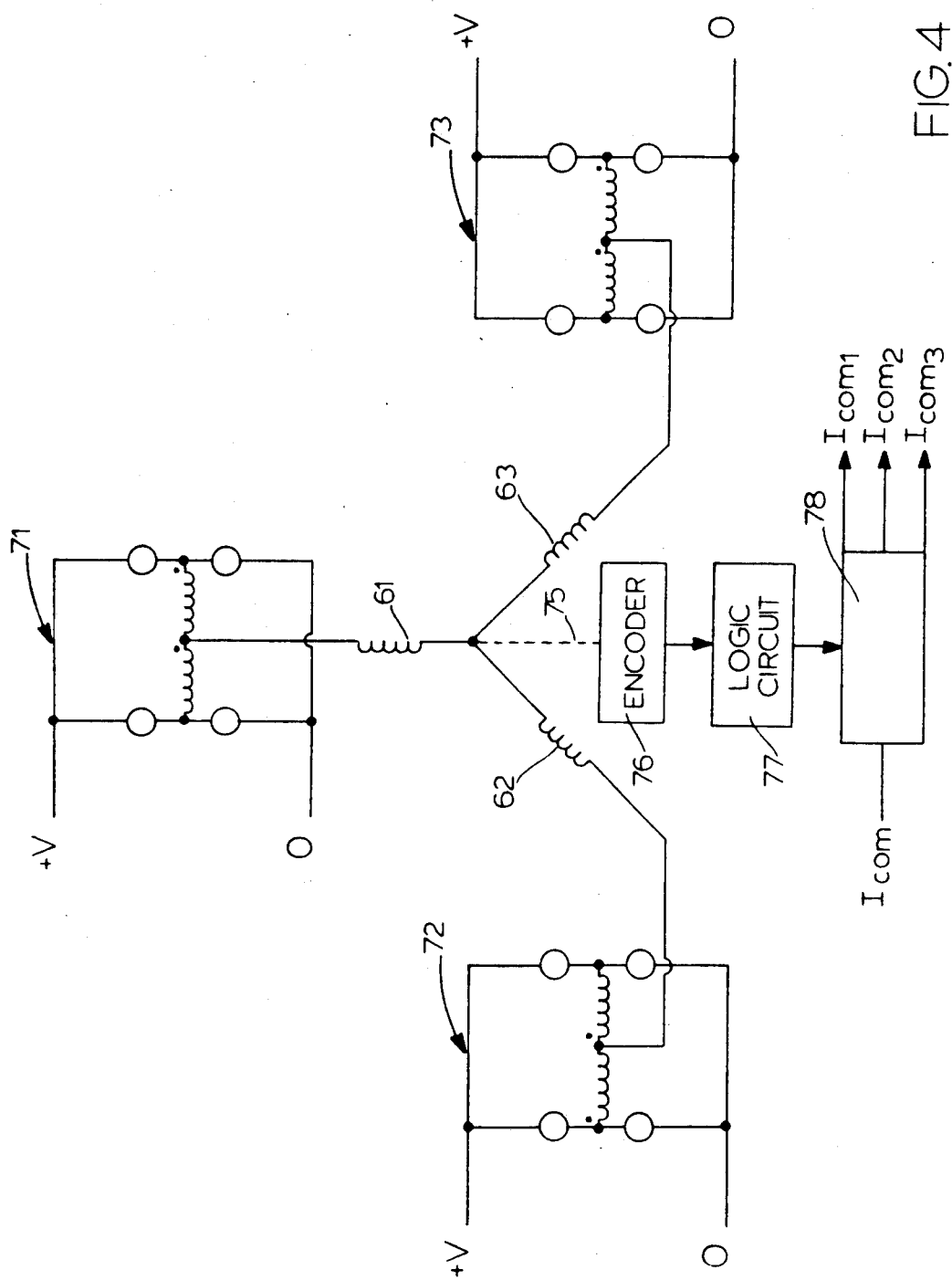
FIG. 4 is a schematic diagram showing how the present invention can be used for controlling a three-phase brushless motor.

FIG. 4 is a schematic diagram showing the use of the present invention in driving a three-phase brushless motor. The three windings of the brushless motor are designated by reference numerals 61, 62, and 63. Each winding is connected to a bridge circuit, designated generally by reference numerals 71, 72, and 73, respectively. Each of the bridge circuits is similar to that shown in FIG. 3, except that there are only four switches and two inductors in each bridge. It turns out that, because the windings are all connected at one point, each pair of bridges in FIG. 4 is electrically equivalent to the full bridge of FIG. 3.

The dotted line 75 illustrates symbolically that the motor shaft (not shown) is connected to an encoder 76. The output of the encoder is connected to a suitable logic circuit which controls a current command circuit 78. Circuit 78 accepts, as input, the command current, and generates three command currents as outputs. These command currents comprise the command "sub-signals" for each bridge. The command currents are used to generate three separate trains of pulses, in the manner described in connection with FIGS. 1 and 2, and the pulses are used to control the bridges in a similar manner. The pulses are generated, and applied to the switches of each bridge, substantially simultaneously.

Clearly, the number of bridges in FIG. 4 is not limited, and the circuit can be easily generalized to the case of n windings and n bridges.

The invention can also be used with a switching power supply. That is, the bridge circuit of the present invention could be used to drive a transformer instead of a motor, and the control voltage could be fixed or variable.

The present invention can be modified in various other ways. For example, the electronic switches can be replaced with equivalent devices. Also, the invention need not be limited to the particular bridge topologies described herein, but may include other ways of implementing the method represented in FIG. 1.

For example, it is necessary only that the PWM circuit be capable of determining whether the absolute value of the dither signal is greater or less than that of the command signal. The output of a circuit which determines these conditions could be used to produce a voltage across the load. A first voltage would be applied across the load when the absolute value of the dither signal is greater than that of the command signal; a second voltage, having a different value, would be applied when the absolute value of the dither signal is less than that of the command signal. In the embodiment discussed above, the first voltage is −V, and the second voltage is zero. It should therefore be apparent that the invention can be generalized to include many equivalent circuits, as different pulse patterns can be defined to produce equivalent physical results. Also, different bridge topologies could be used to control the application of voltage to the load. Finally, the invention can be used in many different contexts, and should not be deemed limited by the specific examples given above. The modifications of the invention, suggested above, and others, should be deemed within the spirit and scope of the following claims.

What is claimed is:

1. A circuit for providing a current through a load, the current being generated by a power supply having a predetermined maximum voltage, the current through the load being determined by a command signal, the circuit comprising:
    (a) means for converting the command signal into a first train of pulses, the pulses of the first train having a width which is representative of the value of the command signal, the first train of pulses being called signal x,
    (b) means for inverting the command signal, and for converting the inverted command signal into a second train of pulses, the pulses of the second train having a width which is representative of the value of the command signal, the second train of pulses being called signal x',
    (c) means for providing a signal which is the complement of signal x, the latter being called signal y,
    (d) means for providing a signal which is the complement of signal x', the latter being called the signal y',
    (e) a pair of bridge circuits, the first bridge circuit including four switching means, two of the switching means being controlled by signal x and two of the switching means being controlled by signal y, the second bridge circuit also including four switching means, two of the switching means of the second bridge circuit being controlled by signal x' and two of the switching means of the second bridge circuit being controlled by signal y',
    (f) the load being connected to both bridge circuits such that the load receives pulses of voltage applied through electrical paths formed in the bridges, wherein the first bridge is connected across two terminals extending from the load, and wherein the second bridge is connected across the same two terminals, wherein both the first and second bridges are connected to each other at the same terminals which extend from the load, wherein the pulses of voltage are of a frequency which is substantially double the frequency of pulses of signal x, and wherein the magnitude of the peak-to-peak voltage across the load is no greater than the magnitude of the maximum voltage of the power supply.

2. The circuit of claim 1, wherein the load is connected to the bridges through a plurality of inductors.

3. The circuit of claim 1, wherein both bridges are capable of defining circuit paths such that both bridges can apply the voltage of the power supply across the load in either of two possible directions.

4. The circuit of claim 1, wherein the switching means comprise electronic switches.

5. A circuit providing a current through a load, the current being generated by a power supply having a predetermined maximum voltage, the current through the load being determined by a command signal, the circuit comprising:
    (a) means for converting the command signal into first and second trains of pulses, the pulses of the first and second pulse trains being out of phase with each other, the widths of the pulses of the first and second pulse trains being proportional to the instantaneous value of the command signal, and (b) at least two bridge circuits connected to receive said first and second pulse trains, for selectively applying the voltage of the power supply across the load, the bridge circuits comprising means for applying zero effective voltage across the load when a pulse from either of said first or second pulse trains is detected, and for applying substantially the full voltage of the power supply appears across the load at all other times, wherein a first bridge circuit is connected across two terminals extending from the load, and wherein a second bridge circuit is connected across the same two terminals, wherein both the first and second bridge circuits are connected to each other at the same terminals which extend from the load.

6. The circuit of claim 5, wherein the logic means includes means for generating the complements of the first and second pulse trains.

7. The circuit of claim 6, wherein the logic means also comprises at least one bridge circuit, the bridge circuit having switching means, each switching means connected to be turned on and off by pulses form one of said first and second pulse trains or their complements, the bridge circuit comprising means for instanteously providing current paths from the power supply through the load and back to the power supply.

8. The circuit of claim 5, wherein at least two of the inductors are magnetically coupled.

9. The circuit of claim 8, wherein each bridge circuit is connected across the load through two inductors, and wherein the inductors connected to different bridge circuits are magnetically coupled, and wherein the inductors connected to the same bridge circuit are not magnetically coupled.

10. A circuit for providing a current through a load, the current being generated by a power supply having a predetermined maximum voltage, the current through the load being determined by a command signal, the circuit comprising:

(a) means for converting the command signal into first and second trains of pulses, the pulses of the first and second pulse trains alternating with each other, the widths of the pulses of the first and second pulse trains being proportional to the instantaneous value of the command signal, and (b) at least two bridge circuits connected to receive said first and second pulse trains, for selectively applying the voltage of the power supply across the load, the bridge circuits comprising means for applying substantially the full voltage of the power supply across the load when a pulse from either of said first and second pulse trains is detected, and for applying zero effective voltage across the load at all other times, wherein a first bridge circuit is connected across two terminals extending from the load, and wherein a second bridge circuit is connected across the same two terminals, wherein both the first and second bridge circuits are connected to each other at the same terminals which extend from the load.

11. The circuit of claim 10, wherein the logic means includes means for generating the complements of the first and second pulse trains.

12. The circuit of claim 11, wherein the logic means also comprises at least one bridge circuit, the bridge circuit having switching means, each switching means connected to be turned on and off by pulses from one of said first and second pulse trains or their complements, the bridge circuit comprising means for instanteously providing current paths from the power supply through the load and back to the power supply.

13. The circuit of claim 10, wherein at least two of the inductors are magnetically coupled.

14. The circuit of claim 13, wherein each bridge circuit is connected across the load through two inductors, and wherein the inductors connected to different bridge circuits are magnetically coupled, and wherein the inductors connected to the same bridge circuit are not magnetically coupled.

15. A method of providing a current through a load in response to a command signal, comprising the steps of:

(a) converting the command signal into first and second trains of pulses, the width of each pulse in the pulse trains corresponding to the instanteous value of the command signal, the pulses of the first train being out of phase with the pulses of the second train, (b) generating third and fourth pulse trains, the third and fourth pulse trains being the complements of the first and second pulse trains, respectively, (c) applying the first and sthird pulse trains to a first bridge circuit, the first bridge circuit including switching means connected to be controlled by the first and third pulse trains, the switching means of the first bridge circuit being arranged such that the voltage of the power supply is applied across the load, by the first bridge circuit, the polarity of the applied voltage being determined by the first and third pulse trains, and (d) simultaneously applying the second and fourth pulse trains to a second bridge circuit connected to the first bridge circuit, the second bridge circuit including switching means connectd to be controlled by the second and fourth pulse trains, the switching means of the second bridge circuit being arranged such that the voltage of the power supply is applied across the load, by the second bridge circuit, the polarity of the applied voltage being determined by the second and fourth pulse trains, wherein the first bridge is connected across two terminals extending from the load, and wherein the second bridge is connected across the same two terminals, wherein both the first and second bridges are connected to each other at the same terminals which extend from the load.

16. A circuit for providing a current through a load in response to a command signal, the current being generated by a power supply comprising means for producing a voltage, the circuit comprising:

(a) means for converting the command signal into a plurality of pulse trains, the pulse trains being out of phase with each other, the widths of the pulses of the pulse trains being proportional to the instantaneous value of the command signal, and (b) a plurality of bridge circuits, each bridge circuit including switching means which are actuated by pulses from the pulse trains, wherein different bridges are controlled by different pulse trains, each bridge circuit being connected across teh load through inductors, each bridge circuit comprising means for selectively applying the voltage of the power supply across the load, depending on the presence or absence of a pulse from one of the pulse trains, wherein all of the bridges are connected across the same two terminals extending from the load, wherein all of the bridges are connected to each other at the same terminals which extend from the load.

17. The circuit of claim 16, wherein there are two bridge circuits, and wherein the inductors connected to different bridge circuits are magnetically coupled.

18. The circuit of claim 17, wherein each bridge circuit is connected to the load through two inductors, and wherein the inductors connected to the same bridge circuit are not magnetically coupled.

19. The circuit of claim 17, wherein the pulses from the first and second pulse trains are 180° out of phase.

20. A circuit for controlling a brushless motor, the motor having at least three windings, each winding having first and second ends, the first end of each winding being electrically connected to the first end of every other winding, the second end of each winding being connected to a bridge circuit, each bridge circuit having four switches, wherein there is one bridge circuit for each winding, wherein each bridge circuit is connected to means for comparing a dither signal with a command signal, the output of the comparing means comprising pulses which control the switches in each bridge circuit, wherein each pair of bridge circuits comprises logic means for selectively applying a voltage of a power supply across a load, the load being defined by the windings connected to the bridge circuits of a given pair, the logic means comprising means for applying the full voltage of the power supply across the load when a specified condition is detected, and for applying zero voltage across the load at all other times, wherein the specified condition is defined as the presence or absence of a pulse from the comparing means.

* * * * *